(12) United States Patent
Metsarinta et al.

(10) Patent No.: US 9,435,005 B2
(45) Date of Patent: Sep. 6, 2016

(54) METHOD FOR PROCESSING SLAGS OF NON-FERROUS METALLURGY

(71) Applicant: Outotec (Finland) Oy, Espoo (FI)

(72) Inventors: Maija-Leena Metsarinta, Vanha-Ulvila (FI); Jussi Liipo, Ulvila (FI); Pekka Kurki, Harjunpaa (FI); Madeleine Scheidema, Pori (FI)

(73) Assignee: Outotec (Finland) Oy, Espoo (FI)

( * ) Notice: Subject to any disclaimer, the term of this patent is extended or adjusted under 35 U.S.C. 154(b) by 56 days.

(21) Appl. No.: 14/394,697

(22) PCT Filed: Apr. 15, 2013

(86) PCT No.: PCT/FI2013/050409
§ 371 (c)(1),
(2) Date: Oct. 15, 2014

(87) PCT Pub. No.: WO2013/156676
PCT Pub. Date: Oct. 24, 2013

(65) Prior Publication Data
US 2015/0122082 A1 May 7, 2015

(30) Foreign Application Priority Data
Apr. 16, 2012 (FI) .................................... 20125410

(51) Int. Cl.
*C22B 7/02* (2006.01)
*C22B 4/00* (2006.01)
(Continued)

(52) U.S. Cl.
CPC . *C22B 7/04* (2013.01); *C04B 5/00* (2013.01); *C22B 4/00* (2013.01); *C22B 5/02* (2013.01); *Y02P 10/212* (2015.11)

(58) Field of Classification Search
CPC .............. C22B 7/04; C22B 5/02; C22B 4/00; C04B 5/00
See application file for complete search history.

(56) References Cited

U.S. PATENT DOCUMENTS

| 1,822,396 A | 9/1931 | Fowler et al. |
| 3,032,411 A | 5/1962 | Johnson |

(Continued)

FOREIGN PATENT DOCUMENTS

| CN | 1405338 A | 3/2003 |
| CN | 101194028 B | 6/2008 |

(Continued)

OTHER PUBLICATIONS

Finnish Search Report, Patent App. No. 20125410, Outotec (Finland) Oyj, dated Feb. 7, 2013, 1 pg.

(Continued)

*Primary Examiner* — George Wyszomierski
*Assistant Examiner* — Tima M McGuthry Banks
(74) *Attorney, Agent, or Firm* — Chernoff, Vilhauer, McClung & Stenzel, LLP

(57) ABSTRACT

A method for processing slags containing iron and non-ferrous metals, to produce clean slag free of detrimental substances and non-ferrous metals and suitable for use as a raw material or construction material. Slag is reduced in a reduction furnace with the help of reducing agents so that at least 5% of the iron of the slag is reduced into metal. Some of the non-ferrous metals, such as zinc, lead, arsenic and cadmium, vaporize. The contents of the reduction furnace are continuously mixed to prevent separation of a metallic phase from the slag. The generated slag-metal mixture is tapped off from the reduction furnace, cooled, crushed and ground to a finer size. Finally, a metal fraction is separated from a clean slag.

17 Claims, 3 Drawing Sheets

(51) Int. Cl.
*C22B 5/02* (2006.01)
*C22B 7/04* (2006.01)
*C04B 5/00* (2006.01)

(56) References Cited

U.S. PATENT DOCUMENTS

| | | | |
|---|---|---|---|
| 4,717,419 | A | 1/1988 | Makinen et al. |
| 5,332,414 | A | 7/1994 | Makinen |
| 5,411,572 | A | 5/1995 | Tuovinen et al. |
| 8,088,192 | B2 | 1/2012 | Roth et al. |
| 2010/0242682 | A1 | 9/2010 | Sasaki et al. |
| 2012/0073406 | A1* | 3/2012 | Ki .............................. C04B 5/06 75/414 |

FOREIGN PATENT DOCUMENTS

| | | | |
|---|---|---|---|
| CN | 102080135 | B | 6/2011 |
| CN | 102094095 | B | 6/2011 |
| CN | 101792863 | B * | 5/2012 |
| DE | 19541673 | A1 | 8/1998 |
| EP | 1641948 | | 4/2006 |
| EP | 2128279 | A1 | 12/2009 |
| EP | 2128279 | B1 | 3/2011 |
| FI | 890395 | A | 7/1990 |
| JP | 2000282154 | A | 10/2000 |
| JP | 2010168641 | A | 8/2010 |
| JP | 2010236069 | A | 10/2010 |
| JP | 2012067375 | A * | 4/2012 |
| WO | 0236834 | A2 | 5/2002 |
| WO | 2006024069 | A1 | 3/2006 |
| WO | 2007065350 | | 6/2007 |
| WO | 2009077651 | A1 | 6/2009 |
| WO | 2011027334 | | 3/2011 |

OTHER PUBLICATIONS

Japan Patent Office, "Notification of Reason for Refusal" issued in application No. 2015-506272 (Office action), Aug. 19, 2015, Tokyo, Japan.

State Intellectual Property Office of the People's Republic of China; Notification of First Office Action; Aug. 19, 2015; 5 pages, Beijing, China.

International Preliminary Report on Patentability from related PCT application No. PCT/FI2013/050409, report issued Oct. 21, 2014, 8 pgs.

European Patent Office, European Search Report issued in EP Application No. 13778649, Dec. 11, 2015, Munich, Germany.

* cited by examiner

METHOD FOR PROCESSING SLAGS OF NON-FERROUS METALLURGY

This is a national stage application filed under 35 USC 371 based on International Application No. PCT/FI2013/050409, filed Apr. 15, 2013, and claims priority under 35 USC 119 of Finnish Patent Application No. FI-20125410, filed Apr. 16, 2012.

FIELD OF THE INVENTION

The invention relates to a method for processing slags of non-ferrous metallurgy, containing iron and valuable metals, to produce clean fayalite sand which is free of detrimental substances and valuable metals and fit for use as a raw material or construction material.

BACKGROUND OF THE INVENTION

Slags of non-ferrous metallurgy are generated as by-product of smelting concentrate or converting matte to separate metal fraction from unwanted fractions. Slag is primarily a mixture of metal oxides and silicon oxides, but it can also contain metal sulfides and metals in elemental form.

By way of example, slag tapped off from a copper flash smelting furnace may contain, depending on the raw material, for instance, magnetite, fayalite, zinc, copper, lead, arsenic, cadmium, and nickel. At present the slag is cleaned either by reduction in an electric furnace or using slag concentration technology. After this kind of cleaning, the slag still contains, depending on the treatment and the raw material, about 0.3-1% copper, about 1-4% zinc, about 0.1-0.4% lead and about 0.1-0.2% arsenic. Such copper and zinc contents in the slag are economically seen quite a loss. Furthermore, the waste slag received from a slag concentrator is very fine, with a grain size of under 0.125 mm. Therefore, detrimental substances contained in the slag may leach when on a dump, thus generating an environmental threat.

It is very common that the waste slag still contains valuable metals and detrimental substances, which tend to make the slag a problem waste unsuitable for utilization. Dumping such slag is expensive because a dumping area must have dense foundation and because storing may require long-term monitoring.

Often the aim of the slag cleaning process is to maximize the recovery of valuable metals such as Co, Ni, and Cu in an alloy with the lowest possible iron content. The amount of metallic iron produced should be kept to a minimum, as the more iron is present in the resulting matte or alloy, the greater the costs of the subsequent hydrometallurgical separation of the valuable metals and the resulting disposal of iron residues.

Generally, the purpose of cleaning copper containing slag in an electric furnace is to reduce oxidized copper to metallic copper and trivalent iron to divalent iron and to settle the metallic copper droplets from the slag, thereby forming a metal layer beneath a slag layer. As the oxygen potential of the slag decreases further, also further reductions take place, such as reduction of divalent iron to metallic iron and reduction of oxidized lead to metallic lead. Stirring the material in the electric furnace can be used to intensify the reduction reactions.

Processes for cleaning slags of non-ferrous metallurgy by reduction in an electric furnace have been presented, for instance, in FI 84368 B, U.S. Pat. No. 4,717,419 A, U.S. Pat. No. 5,332,414 A and U.S. Pat. No. 5,411,572 A. In all these processes reduction is carried out as a partial reduction; in other words, reduction is terminated before metallic iron starts to form. At this stage there is still some copper left in the residual slag. Furthermore, zinc, lead, cadmium and arsenic have not yet completely vaporized. Such reduction is often carried out by surface coke reduction, which requires a long time, because the metal droplets formed during the reduction must be settled, forming a layer of molten metal below the layer of molten slag.

If slag reduction in the electric furnace is carried on further, also iron starts to reduce, and metals with a low boiling point, such as zinc, lead, cadmium and arsenic, vaporize. According to WO 2009/077651 A1, it is known from the prior art to reduce the slag from a suspension smelting furnace in an electric furnace so far that, after the slag reduction, the slag's copper content is so low that a further treatment of the waste slag obtained from the electric furnace is not economically feasible.

U.S. Pat. No. 8,088,192 B2 discloses a three-phase process for recovering non-ferrous metals from metallurgical residuals. The process comprises: (A) a fusion and reduction phase during which a certain quantity of iron is reduced and passes into a copper bath; (B) a settling phase during which metal droplets are allowed to settle from the slag to the copper bath and a part of the slag is removed from the furnace; and (C) an oxidation phase involving oxidation of the iron in the copper bath. Certain non-ferrous compounds are volatilized during phase A and carried away by fumes. Volatile heavy metals, in particular zinc and lead, are recovered from the fumes by means of separators. The reference also teaches stirring the copper bath by injection of inert gas in an alternating current plasma arc furnace treating metallurgical residues. The process is complicated, takes a lot of time and requires large size of reduction furnace.

Another way to improve reduction in an electric furnace comprises introducing inert gas through porous plugs mounted on the bottom of the furnace.

Prior art contains various kinds of substances that can be used as reducing agents in slag reduction. Just to mention a couple of examples: WO 20060240069 teaches the use of carboniferous polymers as metal oxide reducing agents in ferroalloy production; DE 19541673 A1 teaches using ground plastic as a reducing agent in a shaft furnace; in Isasmelt™ reactors, coke may be replaced with plastic.

Consequently, there are lots of reducing agents that can be used in slag reduction, and there are numerous ways to enhance reduction in an electric furnace, for instance, by mixing. However, in the processes of the prior art, the mixing step must always be followed by a settling step to allow the separation of the metal phase from the slag. Settling of metal droplets from the molten slag phase is a slow process. Consequently, a large size of electric furnace and large amount of energy are needed to maintain the desired temperature in the furnace.

PURPOSE OF THE INVENTION

The object of the present invention is to eliminate drawbacks of the prior art and to provide an improved method for producing clean slag which is free of valuable metals and detrimental substances and suitable for further use as it is as a raw material and/or building material.

A further object of the present invention is to minimize any losses of valuable metals and to reduce the generation of unusable waste in non-ferrous metallurgical industry.

SUMMARY

The method according to the present invention is characterized by what is presented in claim 1.

The present invention relates to processing of slags of non-ferrous metallurgical industry. In order to produce clean residual slag suitable for further use, the slag is reduced in a reduction furnace with the help of reducing agents so far that at least part of the iron in the slag turns metallic and detrimental zinc, lead, arsenic and cadmium components vaporize. Reduction is enhanced by efficient stirring, which also prevents separation of metal phase from the slag. The mixture of metal and slag thus produced is tapped into a ladle and slowly cooled, or alternatively, tapped into granulation, whereby the mixture is quickly cooled. After cooling the slag-metal mixture is crushed, if necessary, and ground to a sufficiently fine particle size. The slag particles and the metal particles are separated from each other by suitable means. The metallic phase is recycled back into the metallurgical process, whereas the slag phase is ready for further use as a raw material or building material. Exhaust gas released from the reduction furnace, containing vaporized metals, is oxidized to convert the metals to metal oxides, which are then separated by suitable means. The metal oxides thus produced may be delivered to further use as a raw material for instance in zinc industry.

In the present invention, the slag is reduced, after an optional first reduction stage, in a reduction furnace so far that at least part of the slag's magnetite and fayalite is reduced, thus generating elemental iron. In this connection, some valuable metals of the slag, such as copper and nickel, reduce to metal and form inclusions in the slag. At the same time, some other valuable metals of the slag, such as arsenic, lead and zinc, vaporize and go over to gas phase.

Preferably, reduction is carried out in an electric furnace, which may be either of direct current type (DC) or of alternating current type (AC). Other suitable reduction furnaces comprise a top submerged lance furnace, a Kaldo furnace, or the settler of a suspension smelting furnace The reducing agent used in the reduction furnace may be of a solid type or a gaseous type or a combination of these. The reducing agent can be selected from a group comprising: coke, pulverized coal, graphite, lignite, charcoal, biocoke, biomass (e.g. sawdust, peat), natural gas, hydrocarbons (e.g. butane, methane, propane), oil, recycled plastics, waste rubber, carbon monoxide, hydrogen, ammonia, silicon carbide, calcium carbide, ferrosilicon, aluminum, electronics scrap, other scrap metals, metal sulfides, phosphorus-containing copper and other phosphorus compounds and mixtures thereof, and any combinations of reducing agents together and/or in combination with steam.

During the reduction step, mixing can be intensified by at least one of the following ways: injection feeding of the reducing agent, feeding of the reducing agent through a hollow electrode, use of gaseous or gas generating reducing agents, feeding inert gas through porous plugs mounted on the bottom of the furnace, and use of electromagnetic stirring.

The molten slag-metal mixture may be tapped into ladle and slowly cooled, or tapped into granulation, whereby the cooling is quick. After cooling the slag-metal mixture is crushed, if necessary, and ground. After grinding the slag-metal mixture is subjected to a separation process, which may comprise magnetic separation, gravitational separation, flotation, screening, or a combination of these.

Vaporized metals are oxidized to metal oxides. Gaseous components produced from the reducing agents in the reduction furnace are after-burned. The metal oxides and other solids thus formed are separated from the exhaust gas by means of a scrubber, fabric filters, electrostatic precipitator, wet electrostatic precipitator, or a combination of them. The separated metal containing dust is supplied to further use, for instance to a zinc mill to be used as a raw material.

The slag cleaning method according to the present invention is economically feasible because it yields better recovery of valuable metals, smaller furnace sizes, shorter retention times and, last but not least, efficient conversion of slag to saleable raw materials.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
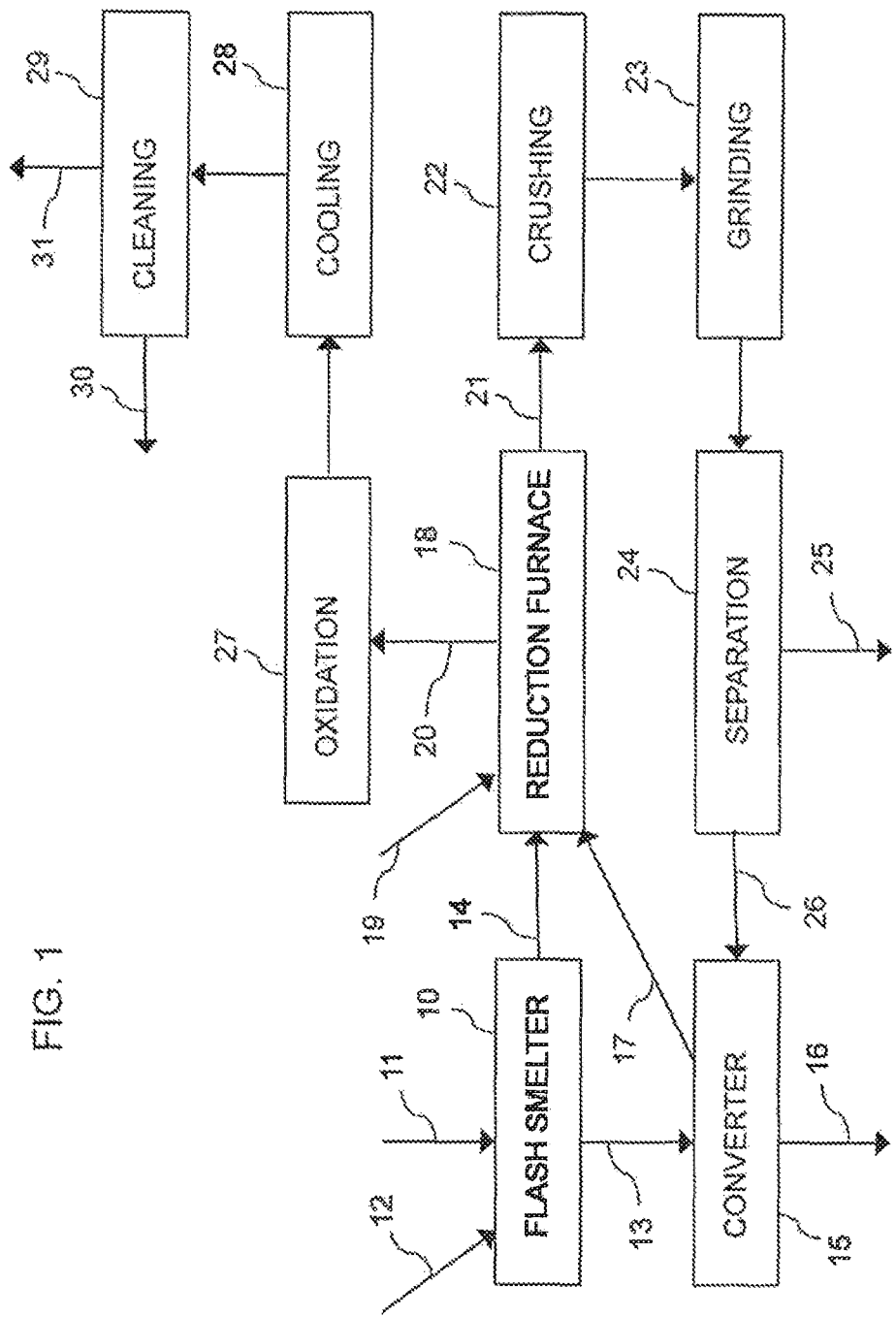
FIG. 1 is a flow chart illustrating one possible slag treatment process in accordance with the present invention.

When aiming at converting metallurgical slag to a detriment-free pulverized material suitable for further use as it is, slag reduction should be extended further than in the methods of prior art, so that iron of the slag is at least partly reduced to elemental metal. In this connection, inclusions of valuable metals, such as copper, are formed in the iron droplets. Iron needs to be reduced to such a degree that the metal phase contains enough iron to make the metallic phase magnetic. Preferably, 5-30% of the iron should be reduced to metal to enable magnetic separation of metals from the slag. In this connection, the temperature should be kept high enough, in practice between 1400° C. and 1500° C., to maintain the mixture of slag and iron-bearing metal in a molten state and to prevent any build-ups on the furnace walls. The retention time may be as short as 0.5-2 hours.

In the present method, the contact between the reducing agent and the metal oxides is enhanced by mixing, which also increases collisions between the formed metal droplets. This leads to an increased droplet size, further improving the separation of the metal droplets from the slag in the subsequent magnetic separation. The method according to the present invention aims to keep the metal droplets within the molten slag and not to let said droplets settle down to the bottom of the furnace. Advantageously, mixing is produced by using hollow electrodes, in which connection an efficient mixing zone is generated under the electrodes and the reducing agent is sucked in the slag. In this method, no separate and time-consuming settling phase is needed, which is why the processing time is shorter than in conventional slag reduction furnaces. The energy consumption is reduced and the size of the reduction furnace may be smaller than in conventional slag reduction furnaces.

There is a large variety of solid and gaseous substances that can be used as reducing agents in the method according to the present invention. Sometimes it may be advantageous to use reducing agents that are able to vaporize, forming a gas that enhances mixing.

Gases exhausted from the reduction furnace contain both metal vapors originating from the slag and components originating from the reducing agents, such as carbon monoxide, hydrogen, etc. The exhaust gas is oxidized and after-burned. Depending on reducing agents used, the exhaust gas may also contain small amounts of chlorine, in which case it may be necessary to arrange a sufficient retention time and temperature for the after-burning step.

After oxidizing and after-burning the exhaust gas is cleaned. Metal oxides and other solids may be recovered from the gas by scrubbing, using fabric filters, electrostatic separation, wet electrostatic separation, or a combination of these. The dust received from the gas cleaning step may be delivered as a raw material for instance into a zinc production plant.

The slag-metal mixture generated in the reduction furnace is tapped from the furnace and cooled. The cooled slag is crushed and ground, advantageously to a grain size of 20 µm-15 mm. Metals and possible sulfides are separated from the slag for instance by magnetic separation and/or gravitational separation and/or flotation and/or screening. The clean slag can be used, for instance, in road construction, in other land filling applications, or as a raw material in building materials.

FIG. 1 shows schematically a flow chart of a process for cleaning flash smelter slag. Fine concentrate 11 is mixed with air, or oxygen, or oxygen-enriched air 12 to form a rapidly reacting suspension in a suspension smelting furnace 10. Sulfide compounds of the feed 11 ignite, oxidize and release heat, acting as a fuel for the process so that no external energy is needed for smelting. In the settler of the furnace 10, molten droplets separate from the gas stream and settle at the bottom of the furnace 10 as distinct matte and slag layers, based on their specific densities.

The molten high-grade matte 13 produced in the flash smelting furnace 10 is fed to a converter 15. The converter 15 produces blister metal 16 and a small amount of slag 17 having still a relatively high metal content. The converter may be, for instance, a Peirce-Smith converter, a Hoboken converter, or of any other suitable type.

The slag 14 from the flash smelting furnace 10 and the slag 17 from the converter 15 are fed to a reduction furnace 18, which may be, for instance, an electric arc furnace. In the reduction furnace 18, reduction of the metals comprised in the slags 14, 17 takes place with the help of reducing agents 19 also added to the furnace 18. Copper compounds contained in the slag are reduced to metallic copper and iron compounds contained in the slag are, at least partly, reduced to metallic iron. At the same time, metals having a relatively low boiling temperature, such as arsenic, lead and zinc, vaporize and go over to gas phase. These vaporized metals are discharged from the reduction furnace 18 together with exhaust gas 20.

The slag and the iron droplets containing copper inclusions are not allowed to separate from each other in the reduction furnace 18 by settling as usual. Instead, the slag-metal mixture is kept in motion by efficiently mixing so that the metallic copper remains entrapped in the metal droplets.

The slag-metal mixture 21 is tapped from the reduction furnace 18 and subjected to cooling (not shown), crushing 22 and grinding 23 to reduce the particle size of the solidified slag-metal mixture. After grinding 23, a magnetic metal fraction 26 is separated from the remaining clean slag 25 in a separation step 24, which may comprise suitable separation methods, such as magnetic separation, gravitational separation, flotation, filtering, and any combinations of these.

The separation step 24 produces clean fayalite sand 25, which is essentially free of valuable metals and detrimental substances and which can be used as a raw material in a variety of uses, for instance as a constituent of concrete and cement, or which can be mixed with other materials for making roadways.

Exhaust gas 20 vented from the reduction furnace 18 is passed to an oxidation step 27, where the vaporized metals are converted to metal oxides and substances originating from the reducing agents are after-burned, if necessary. After the oxidation step 27, the exhaust gas is passed to a cooling step 28 and to a cleaning step 29. The cleaning step 29 may comprise, for instance, scrubbers, fabric filter units, electrostatic precipitators, wet electrostatic precipitators, and any combinations of these.

The metal oxide containing dust 30 from the gas cleaning step 29 may be delivered for instance to a zinc production plant. Clean gas 31 may be released to the atmosphere.

Figure 2:
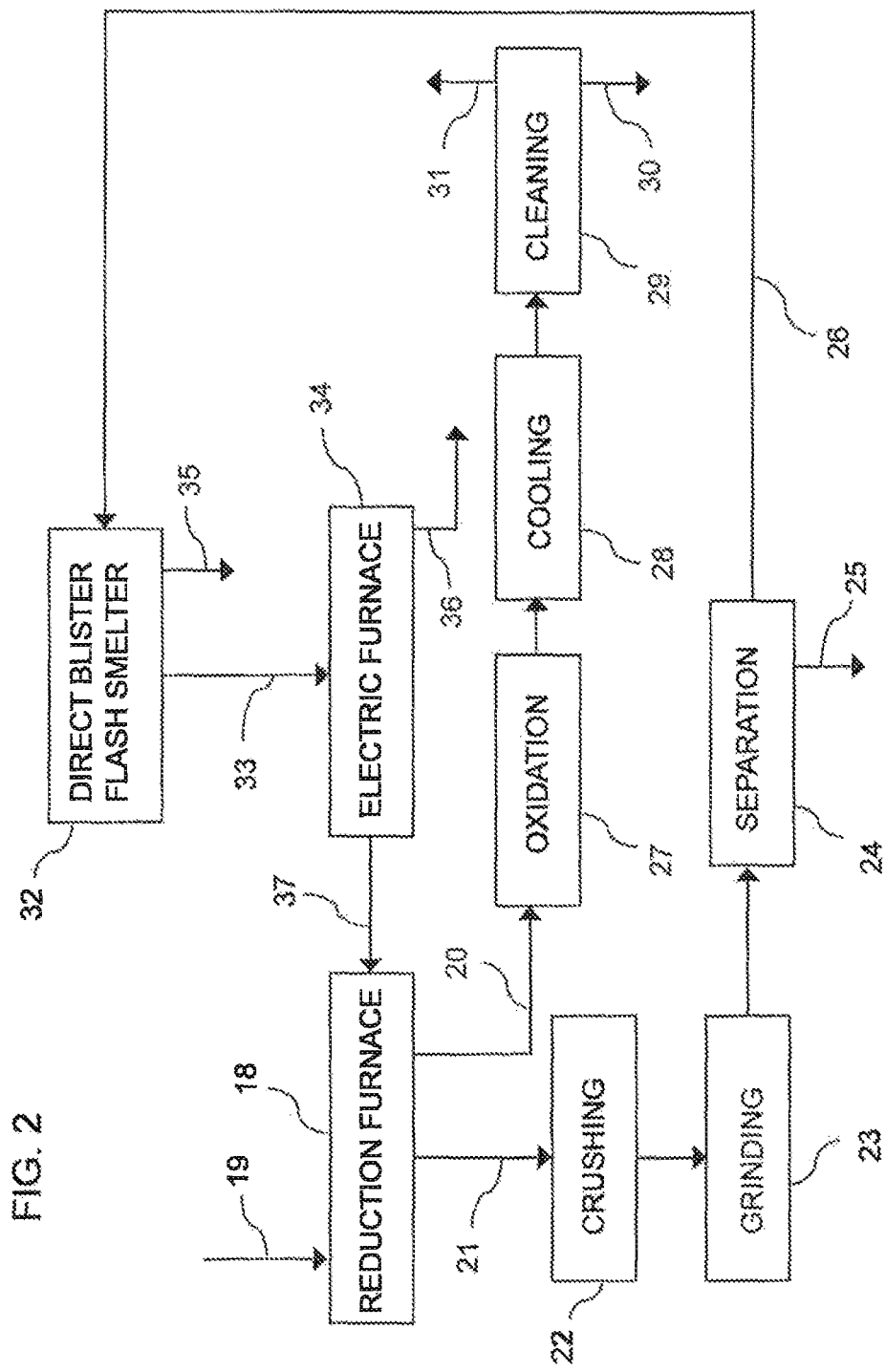
FIG. 2 is a flow chart illustrating slag processing in connection with direct blister flash smelting.

FIG. 2 shows an example of the new slag cleaning process utilized in connection with a direct blister smelting process. The same features are referred to with the same reference numbers as in FIG. 1.

In a direct-to-blister process carried out in a direct blister flash smelter 32, blister copper 35 is produced directly from a concentrate in one step. This method is especially suitable for ore concentrates with low iron content. Slag 33 received from the direct blister flash smelter 32 still contains substantial amounts of copper and other valuable metals, which is why the slag 33 is first fed to an electric furnace 34 for further recovery of copper blister 36. After the electric furnace 34, the remaining slag 37 is supplied to a reduction furnace 18, the operation of which corresponds to that discussed in connection with FIG. 1. Also the further treatments of the slag-metal mixture 21 and the exhaust gas 20 correspond to those discussed in connection with FIG. 1. After the separation step 24, in which the metal fraction 26 is separated from the remaining clean slag 25, the copper-containing metal fraction 26 is recycled back to the direct blister flash smelter 32.

Figure 3:
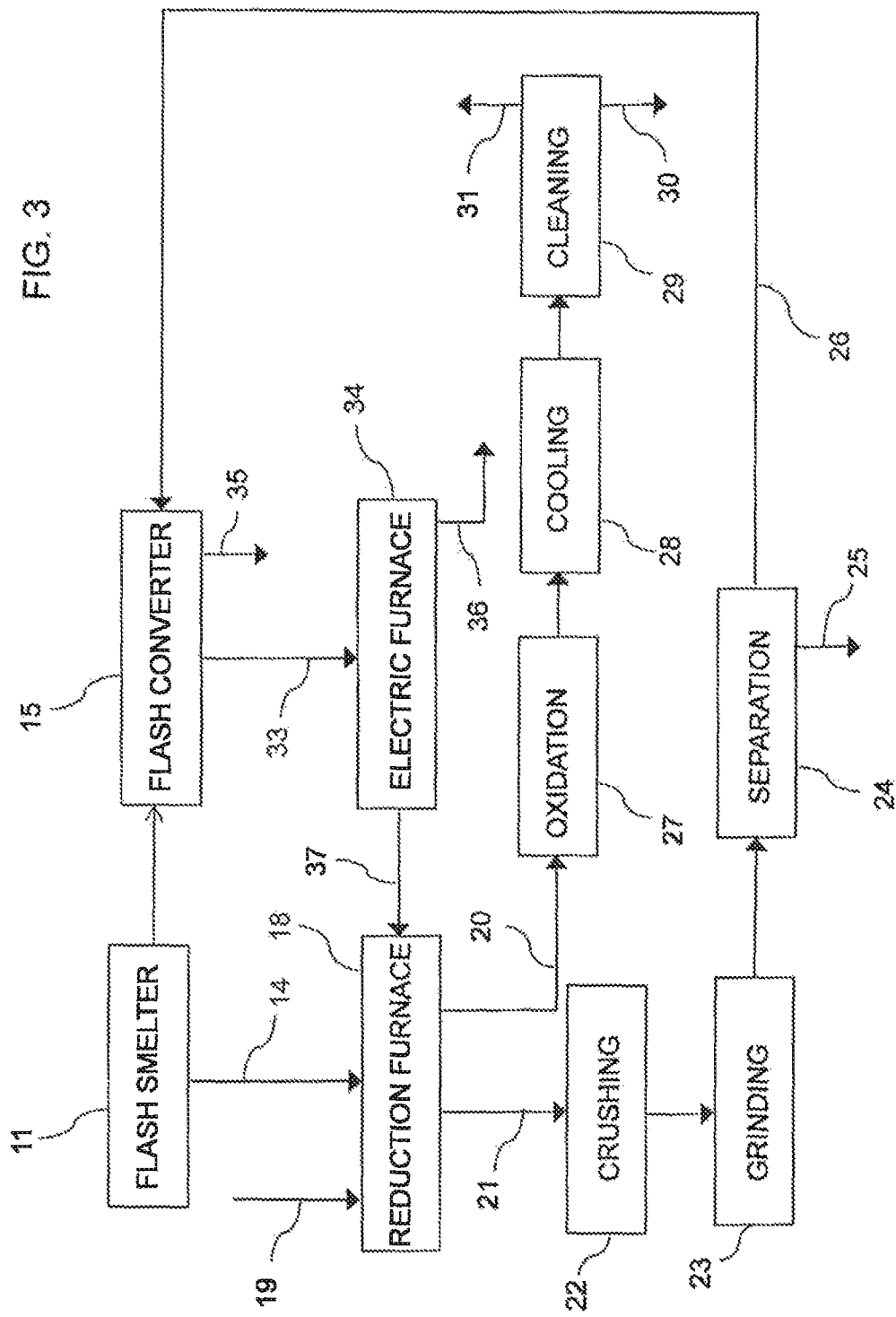
FIG. 3 is a flow chart illustrating slag processing in connection with a process comprising a flash smelter and a flash converter.

FIG. 3 shows an example of a slag cleaning process according to the present invention utilized in connection with a process comprising a flash smelter 10 and a flash converter 15. This kind of process can be used especially when the iron content of the ore concentrate is high. The major difference between FIG. 1 and FIG. 3 is that the process of FIG. 3 comprises an electric furnace 34 for recovery of copper 36 from the slag 33 received from the flash converter 15 before the slag is fed to a reduction furnace 18. The copper-containing metal fraction 26 received from the separation step 24 is recycled to the flash converter 15. The flash converting process in the flash converter 15 is very similar to the flash smelting process in furnace 10. The oxidation of matte proceeds under highly oxidizing conditions so that the sulfidic matte converts to metallic copper.

EXAMPLE 1

The slag composition was the following: Fe 42%, $SiO_2$ 28%, Zn 4%, Pb 0.3%, As 0.3%, Ni 0.06%, $Al_2O_3$ 4%, CaO 2%, Cu 1.5% and MgO 1%. In an X-ray diffractometric analysis, fayalite, magnetite and hematite were identified as the main minerals of the slag. 800 g of the slag was reduced in a 600 ml crucible with silicon carbide at 1350° C. for an hour. The product received comprised a mixture of metal alloy and slag having the following composition: Fe 29%, $SiO_2$ 45%, Zn 0.13%, Pb<0.02%, As 0.005%, Ni<0.004%, $Al_2O_3$ 7%, CaO 2.6%, Cu 0.25% and MgO 1.3%. The slag comprised metal inclusions, containing both copper and iron.

The reduced slag was pulverized to a grain size smaller than 1 mm. Magnetic separation was carried out to recover metals. The residual non-magnetic slag fraction was very clean, containing only a few small metal inclusions.

EXAMPLE 2

The slag composition was the following: Fe 38%, $SiO_2$ 32%, Zn 2.4%, Pb 0.5%, As 0.26%, Ni 0.09%, $Al_2O_3$ 5%, CaO 1%, Cu 1.8% and MgO 1%. In an X-ray diffractometric analysis, fayalite, magnetite and hematite were identified as the main minerals of the slag. 300 g of slag was reduced in a 360 ml MgO crucible with silicon carbide at 1450° C. for half an hour. The product received comprised a mixture of metal alloy and slag having the following composition: Fe 32%, $SiO_2$ 36.5%, Zn 0.43%, Pb 0.056%, As<0.002%, Ni<0.002%, $Al_2O_3$ 5%, CaO 1%, Cu 0.22% and MgO 11%. The slag comprised metal inclusions, containing both copper and iron.

EXAMPLE 3

The slag composition was the following: Fe 38%, $SiO_2$ 32%, Zn 2.4%, Pb 0.5%, As 0.26%, Ni 0.09%, $Al_2O_3$ 5%, CaO 1%, Cu 1.8% and MgO 1%. In an X-ray diffractometric analysis, fayalite, magnetite and hematite were identified as the main minerals of the slag. 600 g of slag, mixed with 59 g of carbon to act as a reducing agent, was reduced in a 600 ml aluminum oxide crucible at 1450° C. for an hour, 30 minutes reducing and 30 minutes nitrogen bubbling. The product received comprised a mixture of metal alloy and slag with the following composition: Fe 34%, $SiPO_2$ 36%, Zn 0.66%, Pb 0.08%, As<0.004%, Ni<0.004%, $Al_2O_3$ 13%, CaO 1.3%, Cu 0.42% and MgO 1.3%. The slag comprised metal inclusions, containing both copper and iron.

The reduced slag was crushed to a grain size of about 1.2 mm and a coarse metal fraction was separated by screening. The slag fraction was pulverized with a roll mill and subjected to a three-stage magnetic separation for the recovery of metal. The residual non-magnetic slag fraction had the following composition: Fe 33.9%, $SiO_2$ 36%, Zn 0.59%, Pb 0.08%, As<0.004%, Ni<0.004%, $Al_2O_3$ 8.2%, CaO 1.4%, Cu 0.36% and MgO 1%.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for processing slag containing iron and non-ferrous metals, the method comprising the steps of:
    feeding the slag into a reduction furnace;
    reducing the slag in the reduction furnace by means of a reducing agent to convert at least some of the non-ferrous metals to metallic form, where reduction occurs at least until 5 mass-% of the iron has reduced into metal and at least some of the non-ferrous metals has vaporized;
    mixing the contents of the reduction furnace during reduction to prevent settling of metal droplets from the slag;
    tapping a molten slag-metal mixture generated in the reduction furnace;
    cooling, crushing and grinding the slag-metal mixture;
    processing the slag-metal mixture to separate a metal fraction from a remaining clean slag, where the remaining clean slag is suitable as raw material in a useful process.

2. A method according to claim 1, wherein processing the slag-metal mixture comprises using at least one of the following methods: magnetic separation, gravitational separation, flotation, and screening.

3. A method according to claim 2, further comprising:
    feeding an exhaust gas from the reduction furnace to an oxidation process, where vaporized metals contained in the exhaust gas are oxidized to metal oxides;
    after the oxidation process, feeding the exhaust gas to a cleaning process, where metal oxides and other solids are separated from the gas;
    delivering the separated metal oxides to a further metallurgical process.

4. A method according to claim 3, wherein the cleaning process comprises at least one of scrubbing, using fabric filters, electric precipitation, and wet electric precipitation.

5. A method according to claim 1, further comprising:
    feeding an exhaust gas from the reduction furnace to an oxidation process, where vaporized metals contained in the exhaust gas are oxidized to metal oxides;
    after the oxidation process, feeding the exhaust gas to a cleaning process, where metal oxides and other solids are separated from the gas;
    delivering the separated metal oxides to a further metallurgical process.

6. A method according to claim 5, wherein the cleaning process comprises at least one of scrubbing, using fabric filters, electric precipitation, and wet electric precipitation.

7. A method according claim 1, wherein the reduction furnace is at least one of an alternating current (AC) electric furnace, a direct current (DC) electric furnace, a top submerged lance (TSL) furnace, a Kaldo furnace, and a settler of a suspension smelting furnace.

8. A method according to claim 1, wherein mixing of the contents of the reduction furnace comprises at least one of injection feeding of the reducing agent, feeding of the reducing agent through a hollow electrode, use of gaseous or gas generating reducing agents, feeding of inert gas through porous plugs mounted at the bottom of the furnace, and electromagnetic stirring.

9. A method according claim 1, wherein reduction in the reduction furnace reduces 5-30% of the iron of the slag into metallic iron.

10. A method according to claim 1, wherein the temperature in the reduction furnace is held between 1400° C. and 1500° C. during the reduction step.

11. The method according to claim 10, wherein the temperature in the reduction furnace is held at about 1450° C. during the reduction step.

12. The method according to claim 1, wherein the retention time in the reduction furnace is 0.5 hours to 2 hours.

13. The method according to claim 1 where the non-ferrous metals includes at least one of copper, nickel, zinc, lead, arsenic, and cadmium.

14. The method according to claim 1 where the non-ferrous metals converted in the reducing furnace to metallic form are different than the non-ferrous metals vaporized in the reducing furnace.

15. The method according to claim 14 where the non-ferrous metals converted in the reducing furnace to metallic form includes at least one of copper and nickel.

16. The method according to claim 14 where the non-ferrous metals vaporized in the reducing furnace includes at least one of zinc, lead, arsenic, and cadmium.

17. The method according to claim 16 where the non-ferrous metals converted in the reducing furnace to metallic form includes at least one of copper and nickel.

* * * * *